Patented Dec. 25, 1923.

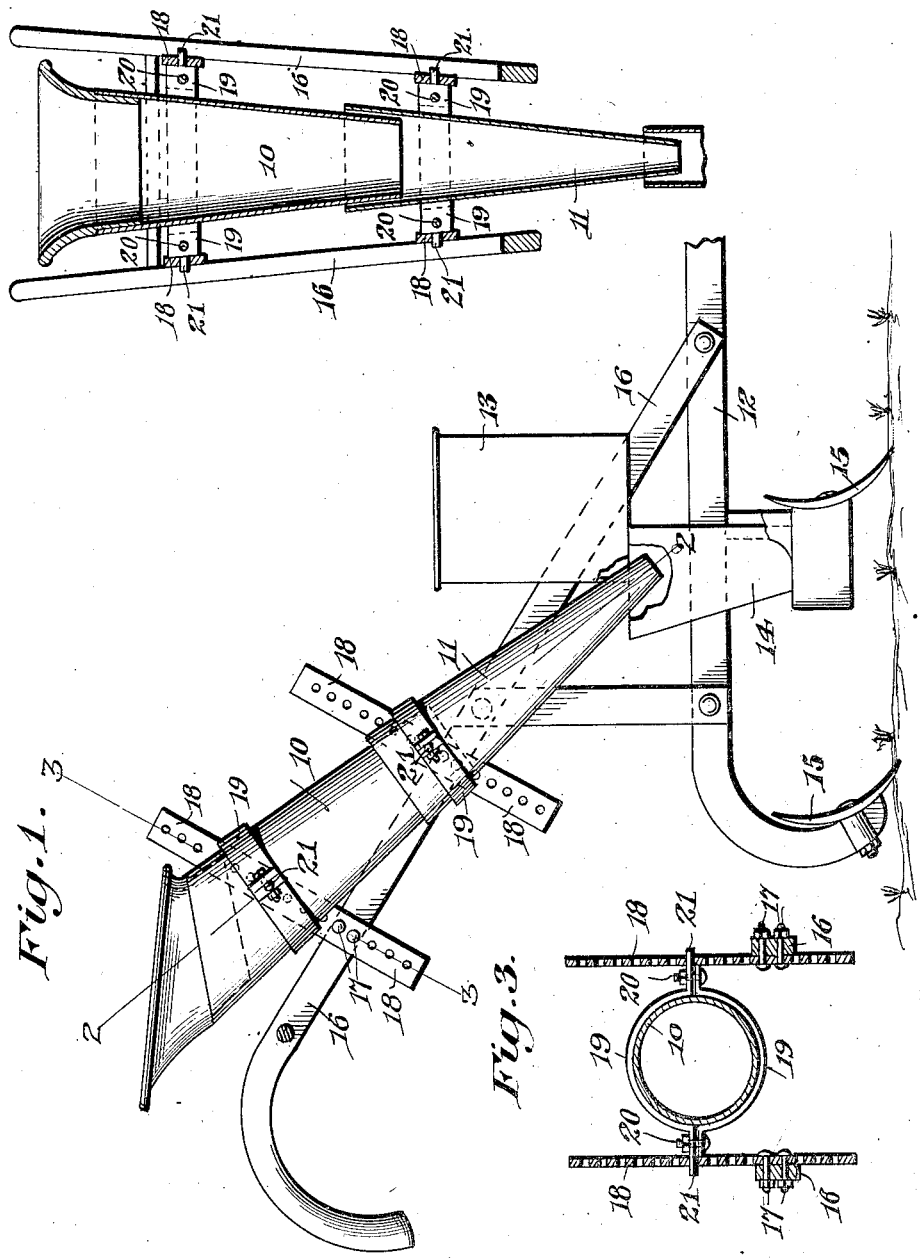

1,478,894

UNITED STATES PATENT OFFICE.

ROBERT LEE ESTES, OF TIPLERSVILLE, MISSISSIPPI.

SEED PLANTER.

Application filed September 12, 1922. Serial No. 587,743.

*To all whom it may concern:*

Be it known that I, ROBERT LEE ESTES, a citizen of the United States, residing at Tiplersville, in the county of Tippah and State of Mississippi, have invented certain new and useful Improvements in Seed Planters, of which the following is a specification.

This invention relates to seed planters, and has for one of its objects to provide a simply constructed attachment whereby seeds other than those passing through the usual seed dropper may be passed through the seed tube at desired intervals and without requiring any change in the structure of the planter or interfering with its ordinary operations.

Another object of the invention is to provide a device of this character which may be readily adapted without material change to planters of various forms and constructions.

With these and other objects in view, the invention consists in certain novel features of construction as hereinafter shown and described and then specifically pointed out in the claims, and in the drawings illustrative of the preferred embodiment of the invention:—

Figure 1 is a side elevation partly in section, of a conventional seed planter with the improved attachment applied.

Fig. 2 is a longitudinal section on the line 2—2 of Fig. 1.

Fig. 3 is a section on the line 3—3 of Fig. 1.

The improved attachment comprises a tubular conductor, preferably in tapering telescoping sections 10 and 11 and coupled to the framework of a seed planter with the discharge end of the conductor within the seed tube of the planter, or otherwise disposed in position to deposit seeds dropped therein on the ground between the "hills" deposited by the ordinary seed dropper.

The conductor may be attached to seed planters of various forms and constructions without material change either in the attachment or the planter, but for the purpose of illustration, is shown attached to a conventional planter including tooth bars 12, seed box 13, seed tube 14, "shovel" members 15, and handle bars 16.

Attached at 17 to the handle bars 16 are supporting strips 18, the latter arranged in pairs in spaced relation and each provided with a plurality of spaced apertures, as shown.

Surrounding each of the conductor sections is a divided band 19 with its terminals connected by bolts 20 and coupled in any suitable manner to the strips 18, for instance by trunnions 21 extending from one of the band members and thence through opposite pairs of the apertures in the strips, as shown.

The bands 19 engage the conductor sections 10—11 loosely, so that they can be adjusted to clamp the sections at any desired location.

By this simple means, the conductor sections may be adjusted longitudinally of the strips 18, and longitudinally of each other, as will be obvious, to adapt the attachment to different sizes and forms of planters.

With a device thus constructed, seeds different from those dropped by the planter in the ordinary manner, may be deposited between the "droppings" or "hills" of the planter, for instance pumpkin, squash, beans, or the like seeds between the hills of corn, as is commonly done.

By this simple attachment, the extra seeds may be accurately deposited where required and scattering or other wasteful operations obviated.

The improved device is simple in construction, can be inexpensively manufactured, preferably of sheet metal, and adapted without material structural change, as before stated, to planters of various forms and sizes.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. The combination with a supporting frame, of coacting pairs of supporting bars connected to the frame in spaced relation, a conductor in telescoping sections with the discharge end of one section adapted to enter a seed tube, a supporting member carried by one of said conductor sections and adjustably coupled to one pair of said bars, and a supporting member carried by the other of said conductor sections and adjustably coupled to the other pair of said bars.

2. The combination with a supporting frame, of coacting pairs of supporting bars connected to the frame in spaced relation, a conductor in telescoping sections, a supporting member carried by one of said conductor sections and adjustably coupled to one pair of said bars, and supporting member carried by the other of said conductor sections and adjustably coupled to the other pair of said bars.

3. The combination with a supporting frame, of coacting pairs of supporting bars connected to said frame in spaced relation, a conductor in telescoping sections, supporting members respectively encompassing said conductor sections, means for independently clamping said supporting members to the conductor sections, and means for adjustably coupling said clamping members to the bars.

4. The combination with a supporting frame, of coacting pairs of supporting bars connected to said frame in spaced relation and each provided with a plurality of spaced apertures, a conductor in telescoping sections, and supporting members respectively encompassing said conductor sections and each provided with lateral pins adapted to enter said apertures and thereby adjustably couple the supporting members to the bars.

In testimony whereof, I affix my signature hereto.

ROBERT LEE ESTES.